United States Patent [19]

Youmans

[11] 4,081,049
[45] Mar. 28, 1978

[54] STEERABLE FRONT WHEEL DRIVE UNIT

[75] Inventor: Donald W. Youmans, San Jose, Calif.

[73] Assignee: FMC Corporation, San Jose, Calif.

[21] Appl. No.: 774,002

[22] Filed: Mar. 3, 1977

Related U.S. Application Data

[63] Continuation of Ser. No. 683,132, May 4, 1976, abandoned.

[51] Int. Cl.$^2$ .......................................... B60K 17/30
[52] U.S. Cl. ............................ 180/43 C; 180/73 D
[58] Field of Search .............. 180/43 R, 43 A, 43 C, 180/44 R, 73 D, 71; 280/96.1; 267/21 A

[56] References Cited

U.S. PATENT DOCUMENTS

| | | | |
|---|---|---|---|
| 1,305,061 | 5/1919 | Church | 180/43 C |
| 1,396,102 | 11/1921 | Dunham et al. | 180/43 C |
| 1,843,146 | 2/1932 | Van Ranst | 180/43 R |
| 1,856,831 | 5/1932 | Guy | 180/43 C |
| 2,026,283 | 12/1935 | Madle | 180/43 C |
| 2,395,333 | 2/1946 | Lee | 180/43 A |
| 2,410,557 | 11/1946 | Watson | 180/24 |
| 2,762,632 | 9/1956 | Irvin | 280/664 |
| 2,942,893 | 6/1960 | Nallinger | 180/73 D X |
| 2,954,089 | 9/1960 | Hill | 180/42 |
| 2,982,369 | 5/1961 | Hausmann | 180/42 |
| 3,075,600 | 1/1963 | Ordorica | 180/43 R |
| 3,162,262 | 12/1964 | Ordorica | 180/43 R |
| 3,221,832 | 12/1965 | Holmstrom | 180/44 R |
| 3,227,237 | 1/1966 | Moreno | 180/43 B |
| 3,295,624 | 1/1967 | Lee et al. | 180/43 R |
| 3,351,037 | 11/1967 | Meili | 115/1 R |
| 3,420,327 | 1/1969 | Nallinger et al. | 180/43 R |
| 3,446,305 | 5/1969 | Cannon | 180/43 R |
| 3,469,647 | 9/1969 | Brown | 180/43 R |
| 3,642,084 | 2/1972 | Takahashi | 180/43 R |
| 3,703,215 | 11/1972 | Takahashi | 180/43 R |
| 3,948,337 | 4/1976 | Richardson | 180/43 R |

FOREIGN PATENT DOCUMENTS

| | | | |
|---|---|---|---|
| 2,036,637 | 2/1971 | Germany | 180/43 R |
| 1,095,135 | 12/1960 | Germany | 180/43 C |
| 1,069,477 | 11/1959 | Germany | 180/43 R |
| 1,049,140 | 11/1966 | United Kingdom | 180/43 C |

Primary Examiner—Philip Goodman
Assistant Examiner—Terrance L. Siemens
Attorney, Agent, or Firm—R. S. Kelly; L. B. Guernsey; C. E. Tripp

[57] ABSTRACT

A final gear-reduction unit is mounted at each wheel of a motor vehicle and is pivotally connected to one end of a lower control arm so that the unit may be turned to steer the vehicle. The other end of the lower control arm is pivotally connected to the frame of the motor vehicle on the side of the vehicle opposite the side on which the wheel is mounted. This allows a considerable amount of up and down movement of the wheel relative to the frame of the vehicle. The wheel is rotatably mounted to the gear-reduction unit with the gear-reduction unit positioned above the axle of the wheel to provide greater ground clearance for the drive to the gear-reduction unit. A pair of universal joints and a length of axle shaft connected between motor-driven differential gears of the vehicle and the gear-reduction unit provides the drive to rotate the wheel. This combination of universal joints and axle shaft allows the wheel to turn to steer the vehicle and allows up and down movement of the wheel relative to the frame of the vehicle. The axle shaft is mounted in a swept-back position so that the angle at the wheel between the axle shaft and the direction of movement of the motor vehicle is less than 90° when the wheel is pointed straight ahead. The swept-back axle shaft decreases the turning radius of the motor vehicle by permitting a greater permissible turn angle on the inside wheel of the vehicle.

14 Claims, 9 Drawing Figures

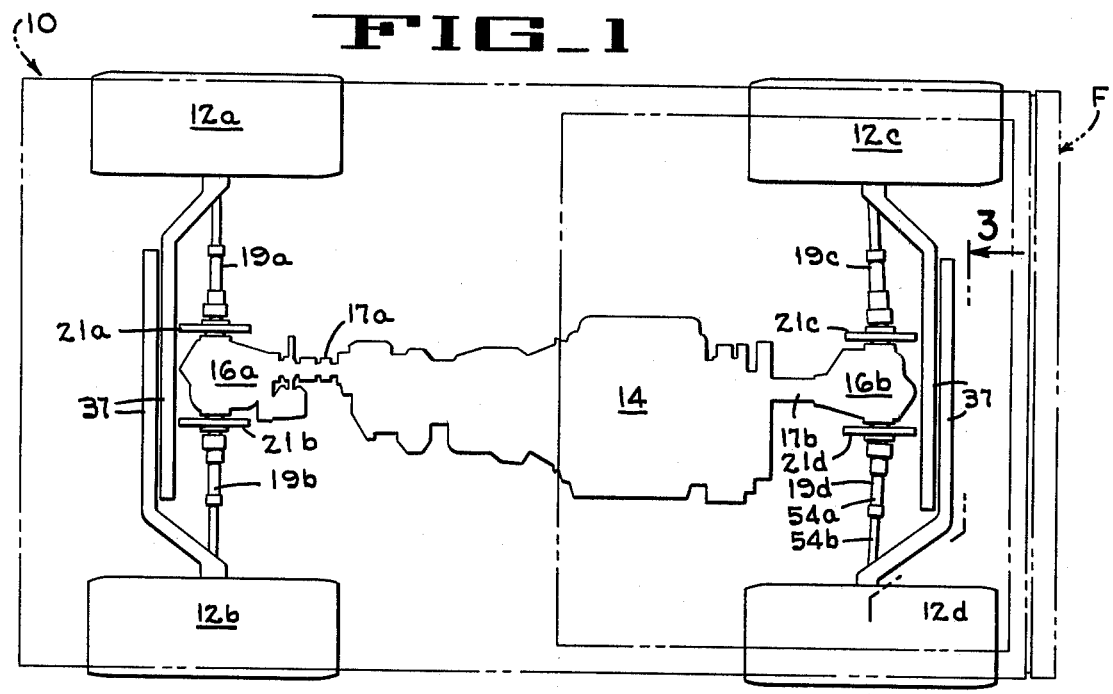
FIG_1
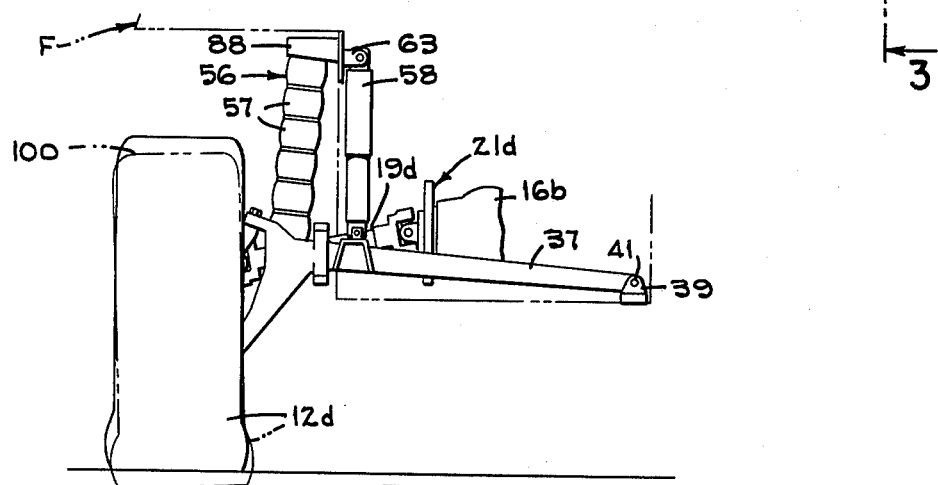
FIG_5
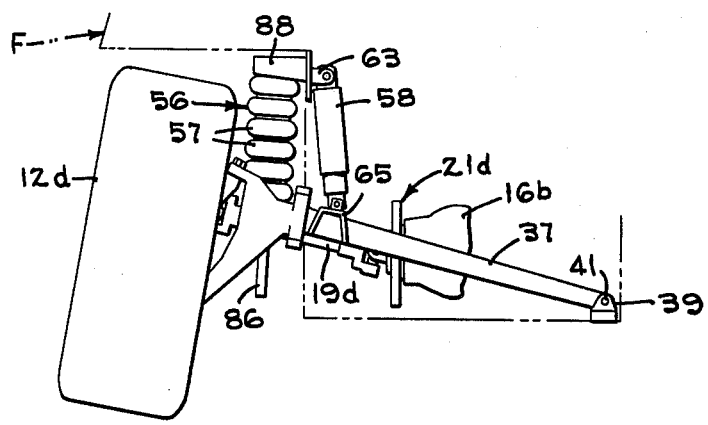
FIG_6

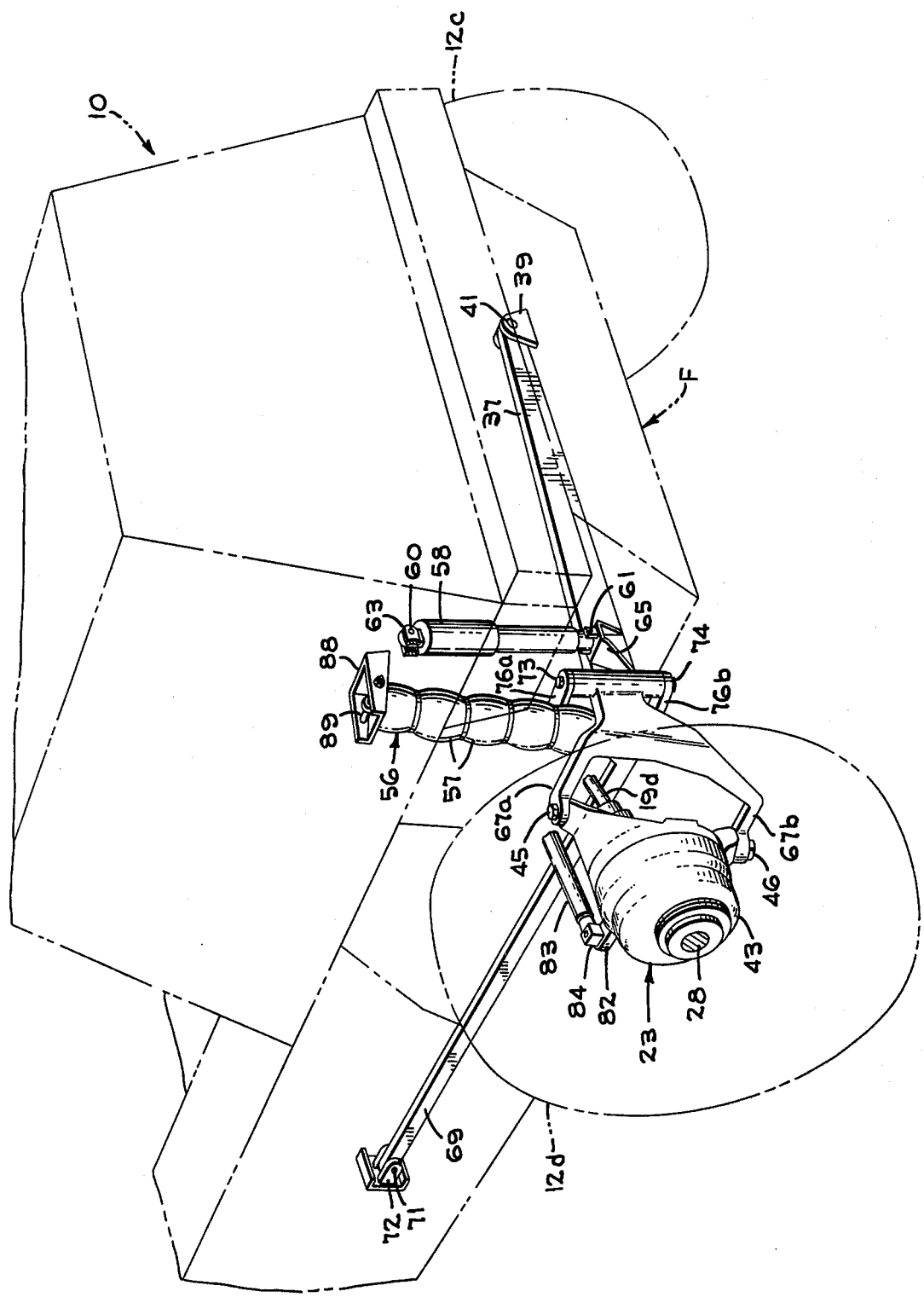

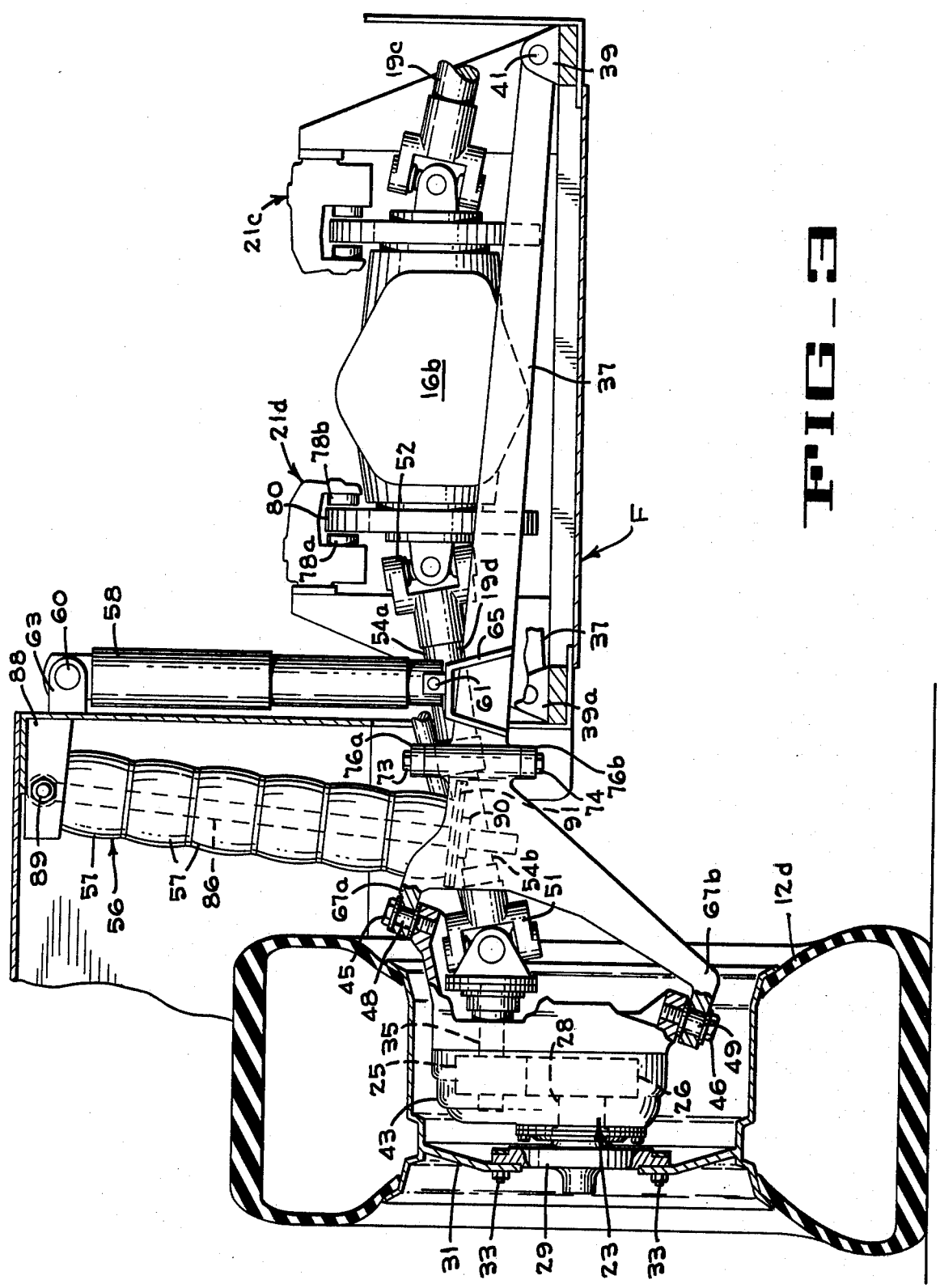
FIG_3

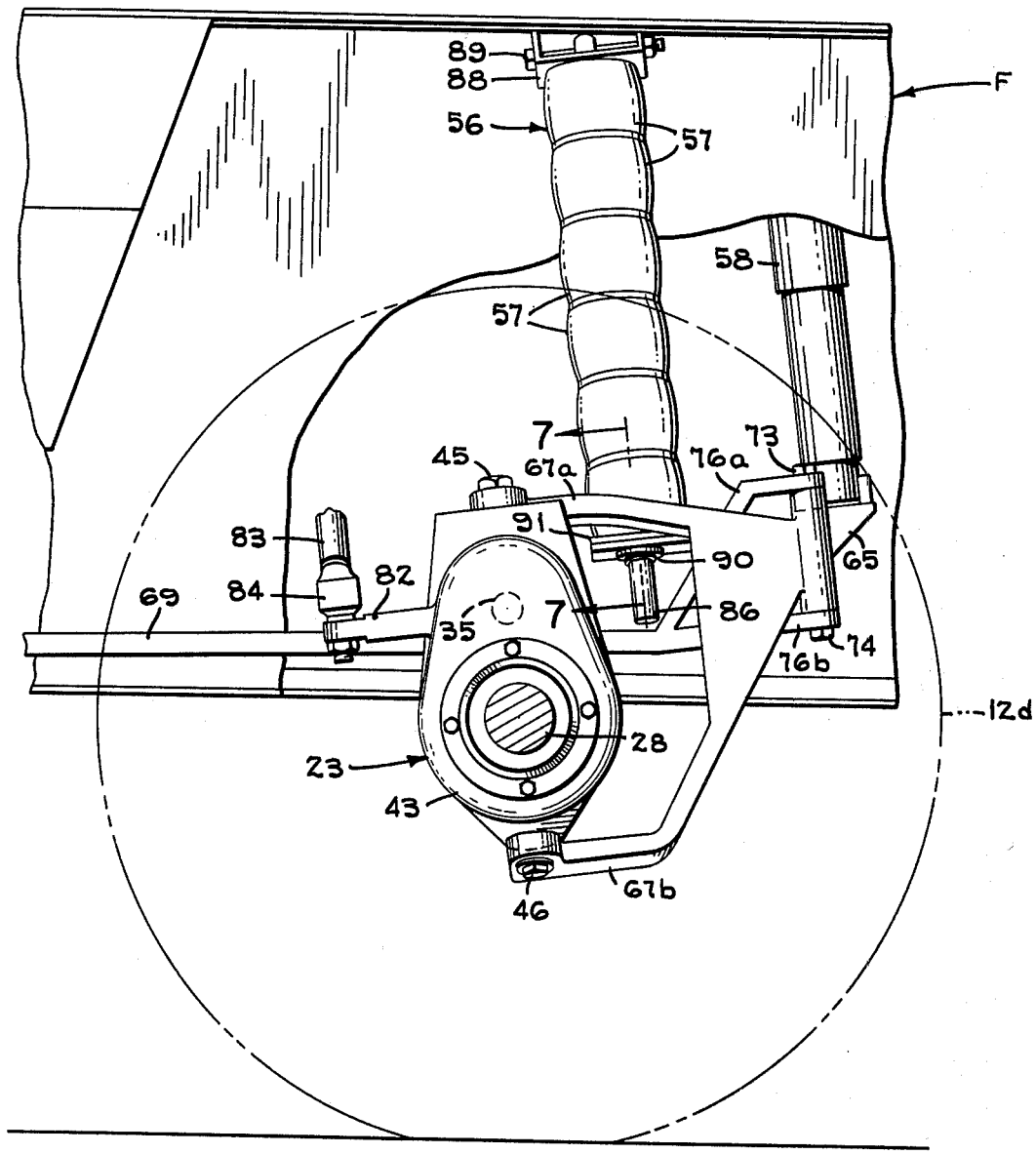
FIG_4
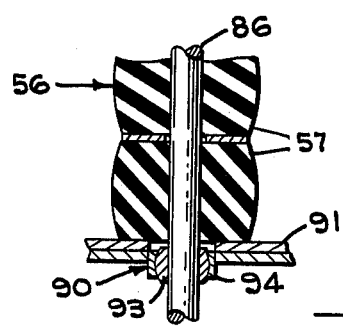
FIG_7

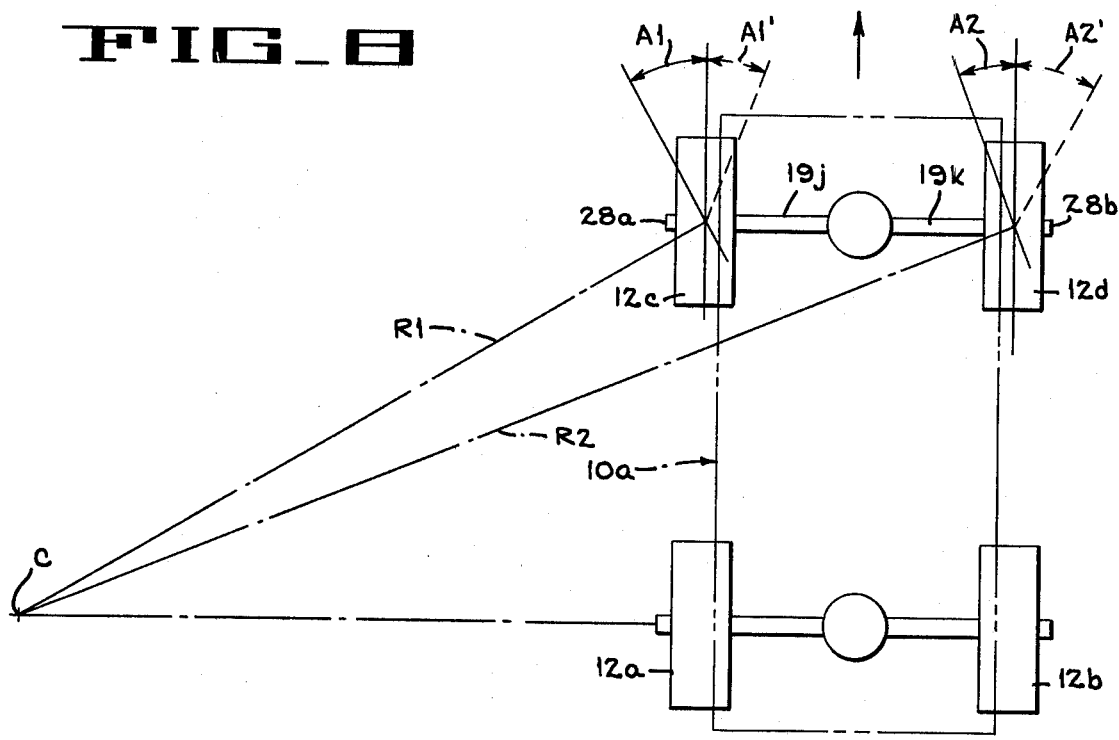
FIG_8
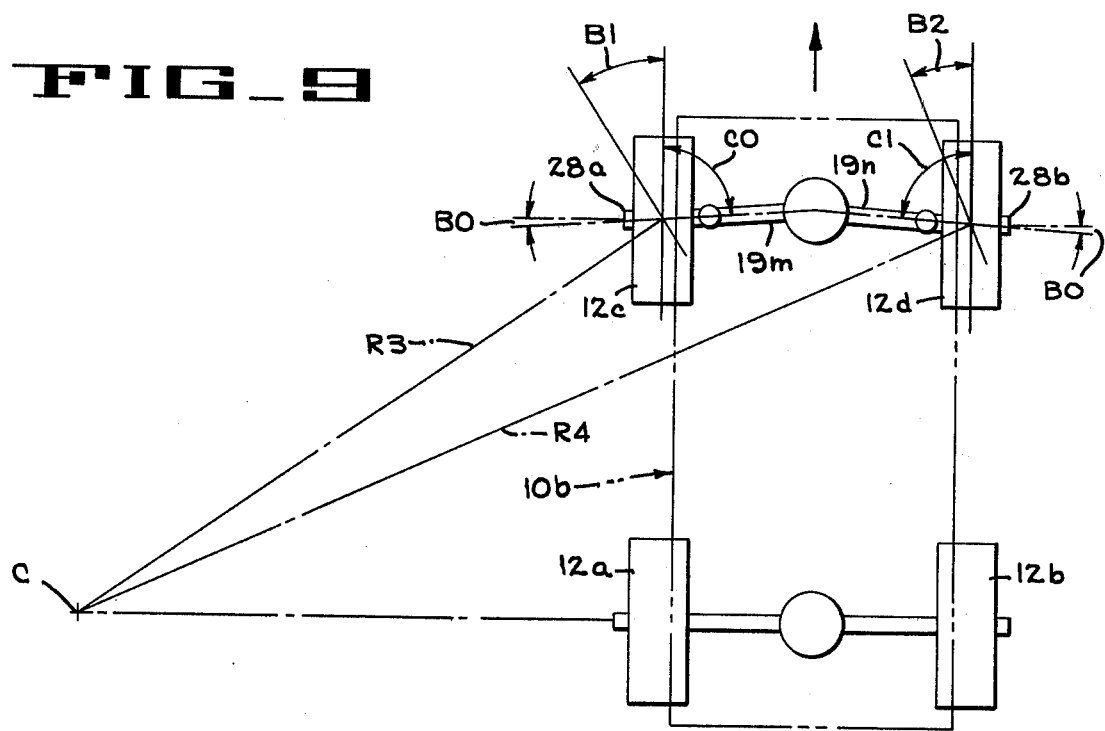
FIG_9

STEERABLE FRONT WHEEL DRIVE UNIT

This is a continuation, of application Ser. No. 683,132 filed May 4, 1976, now abandoned.

The invention herein described was made in the course of or under a contract with the Department of the Army.

BACKGROUND OF THE INVENTION

1. Field of the Invention

The present invention pertains to vehicle wheel drive systems, and more particularly, it pertains to steerable power-driven wheels.

2. Description of the Prior Art

Relatively light high mobility tactical motor vehicles are quite useful in moving people and supplies over relatively rugged terrain where commercial automobiles and trucks are not able to travel. These tactical vehicles are especially useful in transporting military personnel, sportsmen, hunters and supplies into areas which are off the normal roads and highways. To reduce the chances of the vehicle becoming stuck in sand, mud or loose dirt and to enable the vehicle to carry larger payloads over the rugged terrain it is desirable that power be applied to all of the wheels of such a vehicle.

It is important that these off-the-road vehicles have a relatively high ground clearance and that the axles be raised to provide protection from damage and allow the vehicles to move freely over rocks, stumps and other obstacles. It is also essential, of course, that wheels on at least one end of the vehicle be steerable.

Some widely used vehicles, including the Volkswagen Microbus, mount a final-drive gear-reduction unit directly upon the wheels which are to be powered. However, these vehicles have the in-the-wheel gearing unit mounted on the rear wheels which are not steerable. The gear-reduction unit serves to convert a high-speed low-torque input into a lower-speed higher-torque output. This allows the use of a relatively small drive shaft between the motor and the differential gears and relatively small drive axles between the differential gears and the gear-reduction units at the drive wheels. Each in-the-wheel gear-reduction unit is mounted with the drive axle above the wheel axle to provide greater ground clearance for the drive axle which is coupled between the gear-reduction unit and the differential gears to provide power to the wheels.

One type of prior art apparatus having a steerable wheel with a gear-reduction unit at the wheel is shown in the prior U.S. Pat. No. 2,762,632 to Irvin. This apparatus includes a relatively complex suspension system which concentrates the wheel-related loads at the very front end of the vehicle and which generally comprises a pair of arms, a pair of torsion bars and a spring to connect each of the wheels to the frame of the vehicle.

SUMMARY OF THE INVENTION

The steerable power-driven wheels of the present invention each include a gear-reduction unit having an inpur shaft and an output shaft with the wheel being rotatably mounted on the output shaft. The gear-reduction unit is pivotally connected to one end of a control arm so that the wheel can pivot about a generally vertical axis, and the other end of the control arm is pivotally connected to the frame of the vehicle so that the wheel (and control arm) can rotate about an axis extending longitudinally of the vehicle. A spring support means is connected between the frame of the vehicle and that end of the control arm near the gear-reduction unit. The control arm thereby provides a light-weight sturdy mounting for the gear-reduction unit. A universal drive means is connected between the input shaft of the gear-reduction unit and differential gearing of the vehicle to provide power to the gear-reduction unit. This combination (1) allows the gear-reduction unit to be mounted above the wheel axle to provide additional ground clearance for the frame of the vehicle, (2) permits power to be coupled to the steerable vehicle wheels, and (3) allows a considerable amount of up and down movement of such wheels relative to the frame of the vehicle.

Another feature of the present invention is the swept-back mounting of the universal drive means for the steerable powered wheels so that the angle at the wheel between the drive means and the direction of movement of the vehicle is less than 90° when the wheels are pointed in a straight-ahead direction. This permits the inside of the vehicle to turn over a greater angle and thereby decreases the turning radius of the vehicle.

BRIEF DESCRIPTION OF THE DRAWINGS

FIG. 1 is a diagrammatic plan view of a motor vehicle having the steerable front wheel drive system of the present invention.

FIG. 2 is an enlarged perspective view of one of the steerable wheels of the vehicle of FIG. 1 particularly disclosing the means for mounting the gear-reduction unit to the frame of the vehicle, said frame being shown only diagrammatically in phantom lines.

FIG. 3 is an enlarged section taken on line 3—3 of FIG. 1 and particularly illustrating details of the mounting and the coupling of power to one of the steerable wheels of the vehicle.

FIG. 4 is a side elevation of the steerable wheel drive and mounting assembly shown in FIG. 3 with the wheel itself being removed and shown only in phantom lines.

FIGS. 5 and 6 are operational views in front elevation showing the steerable wheel of FIGS. 2 and 3 in a normal position and an elevated position, respectively.

FIG. 7 is an enlarged section taken on line 7—7 of FIG. 4.

FIG. 8 is a diagrammatic plan view of a conventional motor vehicle having the drive axles mounted at 90° to the direction of travel of the vehicle.

FIG. 9 is a diagrammatic plan view of the motor vehicle of the present invention particularly illustrating the swept-back axle arrangement.

DESCRIPTION OF THE PREFERRED EMBODIMENT

Referring now more particularly to the drawings, FIG. 1 discloses (in diagrammatic outline only) a motor vehicle 10 having a plurality of wheels 12a–12d which are arranged to be powered by a motor and transmission 14. Power is coupled from the motor and transmission to a pair of differentials 16a and 16b at opposite ends of the vehicle by a pair of drive shafts 17a and 17b, respectively. Power is coupled from the differentials to each of the wheels by a drive axle 19a–19d so that power will be applied simultaneously to all four wheels of the vehicle. The front wheels 12c and 12d may be steered by a conventional vehicular steering arrangement (not shown) including a steering wheel, tie rods and steering arms that are connected to the wheels. A plurality of inboard disc brakes 21a–21d provide braking for the drive axles.

FIGS. 2–4 disclose the details of one of the steerable power-driven wheels 12d of the vehicle of FIG. 1. The wheel will be seen to have attached thereto a final gear-reduction unit 23 which includes a pair of spur gears 25 and 26 (FIG. 3) that provide a reduction in speed between the drive axle 19d and the wheel 12d. For example, the drive gear 25 and the driven gear 26 may be of the relative size to provide a gear ratio of 1 to 1.5 to reduce the output speed of the gear-reduction unit to ⅔ of the input speed. The larger, driven gear 26 is mounted on an output shaft 28 which is connected to a plate 29 which, in turn, is connected to the wheel rim 31 by a plurality of circumferentially spaced bolts 33. The smaller gear 25 of the gear-reduction unit is connected to an input shaft 35 that is connected to the drive axle 19d. The gears 25, 26 and their associated shafts 28, 35 are rotatably mounted in a housing 43 so that they are fully enclosed.

The gear-reduction unit 23 is connected to the frame F of the vehicle by a lower control arm 37 (FIGS. 2 and 3) having one end thereof pivotally connected to an upstanding mounting bracket 39 on the frame by a bolt 41. Thus, the wheel 12d is mounted so that it can move up and down as the control arm rotates about the axis of bolt 41 which extends longitudinally of the vehicle. The other (outer) end of the control arm 37 is pivotally connected at two vertically spaced points to the housing 43 of the gear-reduction unit by a pair of shoulder bolts 45 and 46 (FIG. 3) which are journalled in a pair of teflon-lined journal thrust bearings 48 and 49, respectively. The gear-reduction unit may be turned about the inclined axis of the pivot points, as determined by the bolts 45 and 46, so that the wheel may be turned about a vertical axis to steer the vehicle.

As shown in FIG. 3, power is coupled from the differential 16b to the gear-reduction unit 23 through a pair of universal joints 51 and 52 and the splined drive axle 19d. The universal joint 52 is connected between the inner end of the drive axle 19d and the output shaft (not shown) of the differential 16b. The universal joint 51 is connected between the outer end of the splined drive axle 19d and the input shaft 35 of the gear-reduction unit 23. This combination of universal joints and drive axle allows the wheel and the attached gear-reduction unit to be turned to steer the vehicle and also allows the wheel to move up and down relative to the frame F of the vehicle while power is continuously supplied to the wheel.

The frame F of the vehicle and the attached superstructure of the vehicle is supported by an elongated elastomeric spring 56 which is connected between the frame and the outer end of the lower control arm 37 near the gear-reduction unit 23 (FIG. 3). The elastomeric spring includes a plurality of stacked elastic sections 57 (FIG. 7) slidably mounted along the length of a rigid spring guide rod 86. Each of the elastic sections is provided with a hole through the center thereof with the rod 86 inserted through these holes so that the sections will be free to move up and down on the rod as the spring 56 compresses and expands between the frame and the control arm. The upper end of the spring guide rod 86 is pivotally connected by a bolt 89 to a bracket 88 which is connected to an upper portion of the frame structure F (FIGS. 3 and 4). The lower end of the spring guide rod is slidably mounted in a spherical bearing 90, the details of which are shown in FIG. 7. The spherical bearing 90 is mounted in a bracket 91 which is attached to a widened portion of the lower control arm 37 directly adjacent to its connection with the wheel. The lower control arm 37 and the elastomeric support spring 56 support the frame on the wheel and allow the wheel to move up and down in relation to the frame of the vehicle as shown in the operation views of FIGS. 5 and 6.

The spherical bearing 90, disclosed in FIG. 7, will be seen to include a ball 93 mounted inside a liner 94 that is secured to the support bracket 91. The ball is mounted to pivot in all directions inside the liner. The spring guide rod 86 is slidably mounted in the ball to allow the rod to move up and down as the spring 56 expands and contracts.

A shock absorber 58 (FIGS. 2 and 3) is also connected between the frame F of the vehicle and the lower control arm 37 by a pair of bolts 60 and 61. The upper end of the shock absorber 58 is pivotally connected by a bolt 60 to an ear 63 which extends outwardly from the upper portion of the frame adjacent to the mounting for support spring 56 while the lower end of the shock absorber is connected by a bolt 61 to an inverted channel bracket 65 which is fastened to the forward face of the lower control arm 37. The wheel 12d can move up and down in relation to the frame of the vehicle as the lower control arm is pivoted on the right side of the frame (as viewed in FIG. 3). The frame is supported by the elastomeric springs 56 (one for each wheel 12a–12d) and any movement of a wheel relative to the frame will be dampened by the associated shock absorber 58. The shock absorber also limits the distance that the wheel can move downward in relation to the frame of the vehicle.

The wheel 12d is pivotally mounted at the left end of the lower control arm 37 (as viewed in FIG. 3) while power is continuously supplied by the drive axle 19b which is positioned between the upper jaw 67a and the lower jaw 67b of the lower control arm which mount the thrust bearings 48 and 49 and connect the outer end of the control arm to the wheel (see FIG. 4). A trailing arm 69 is also used to secure the lower control arm to the frame F as best shown in FIG. 2. One end of arm 69 is pivotally connected to the frame F by a bolt 71, said bolt being mounted in a clevis 72 as seen in FIG. 2. The other end of the trailing arm 69 is split into upper and lower mounting fingers 76a and 76b (FIG. 4) which are rotatably connected to the lower control arm 37 by a pair of bolts 73 and 74 (FIGS. 2–4). The trailing arm 69 serves to limit the forward and rearward movement of the lower control arm 37 while allowing vertical movement of the outer end of the control arm which is attached to the wheel 12d. It will be noted that the trailing arm is relatively long so that the gear-reduction unit will move up and down in a very shallow arc which is nearly a straight line as seen from the side of the motor vehicle.

The arc of the circle in which the wheel 12d moves up and down as seen in the front view of FIG. 3 is determined by the length of the lower control arm 37. As can be seen in FIG. 3, the radius of this arc is different than the distance between the wheel and the universal joint 52 which connects the drive axle to the differential 16b that is fixed to the frame F. Therefore, the drive axle 19d is splined and extendable to allow the length of the axle to change as the wheel moves up and down relative to the frame. The axle 19d includes a larger diameter portion 54a and a smaller diameter portion 54b (FIGS. 1 and 3) which telescope together to allow the drive axle to change lengths as the wheel moves up and down.

The disc brake 21d (FIG. 3) include a pair of disc pads 78a and 78b which are connected to the frame of the vehicle and which are movably mounted in the conventional manner so that they can be moved into engagement with a rotating disc 80. The disc 80 is connected to the drive axle between the differential 16b and universal joint 52 and therefore rotates at the same speed as the drive axle 19d. It will be noted that the disc 80 rotates at a higher speed than the wheel 12d; thus, the braking efficiency of the vehicle is higher than if a brake unit was mounted on the wheel as with conventional vehicles.

While not shown in detail, it will be recognized that the mounting for wheel 12c and axle 19c is exactly the same as that previously described for wheel 12d and and axle 19d. As seen in FIG. 3, an ear 39a on the frame F serves to mount the inner end of the control arm 37 which guides the movement of wheel 12c. The rear wheels 12a and 12b of the vehicle 10 are also secured to the frame F by overlapped control arms 37 as shown in FIG. 1 and as previously described.

Apparatus for steering the wheels 12c and 12d of the vehicle is disclosed in FIGS. 2 and 4. Leverage for pivotally moving the wheel and attached gear-reduction unit 23 about the bearings 48 and 49 is provided by a steering knuckle arm 82. The knuckle arm is mounted on the housing 43 of the gear-reduction unit and is connected to a steering tie rod 83 by a joint 84. The tie rod 83 is, in turn, connected to the conventional steering gear and steering wheel (not shown).

The upper and lower limits of the travel of the wheel 12d relative to the frame of the vehicle are shown in FIGS. 5 and 6. FIG. 5 illustrates the static position of the wheel i.e., where all four wheels of the vehicle are on a uniform flat surface. The phantom line indication 100 in FIG. 5 shows the "rebound" position of the wheel when there is maximum spacing between the upper portion of the wheel 12d and the frame F. This maximum spacing is limited by the extendable length of the shock absorber 58. In FIG. 6 the "full up" position of the suspension system is shown wherein the upper portion of the wheel 12d is close to the frame F and the elastomeric spring 56 is compressed. It will be noted that the maximum downward travel of the wheel is only about one-fifth of the maximum upward travel in order to combine good riding qualities with cross country speed and clearance. One of the limiting factors in the amount of vertical travel of the wheel relative to the frame which can be accommodated is the maximum amount of bending that can be obtained in the universal joints 52 and 51 on the drive axle 19d when power is applied to the wheel.

The maximum permissible amount of bending of the universal drive joints 52 and 51 also limits the minimum turning radius of the vehicle. The minimum turning radius of a conventional vehicle can be seen by referring to FIG. 8 which is a plan view of a prior art motor vehicle 10a having a pair of steerable wheels 12c and 12d each mounted on a corresponding supporting axle 28a and 28b. Power is coupled to the wheels 12c and 12d by a pair of drive axles 19j and 19k that are provided with universal joint couplings as described hereinbefore. The axles 19j and 19k are mounted in a straight line transversely of the vehicle in the conventional manner. Each of the wheels 12c and 12d of FIG. 8 has a maximum turning angle which is determined by the amount of bending that is possible at the universal joints (not shown) of the drive axles 19j and 19k. The vehicle, in its minimum turning circle, moves in a circle around the center C with the inside wheel 12c inscribing an arc having a radius R1 and the outside wheel 12d inscribing an arc having a radius R2. It can be seen that the turning angle A1 of the wheel 12c will be greater than the turning angle A2 of the wheel 12d when the vehicle is turning toward the left. On the other hand, when the vehicle is making a right turn, angle A2' will be greater than angle A1'. For example, let us assume that the maximum angle that each of the wheels can turn in either direction is 45°. When the vehicle makes a tight turn to the left angle A1 will be equal to 45°, while angle A2 will be less, for example, 33°. The difference between angle A1 and A2 is determined by the distance between the front wheels 12c and 12d relative to the turning radius of the vehicle. When the vehicle makes a tight turn to the right, angle A2' will be 45° while angle A1' will be 33°. In this example, the maximum total amount of turning of the wheels is plus and minus 45° from the straight-ahead position for a total of 90°.

The turning radius of the vehicle can be decreased significantly by using the swept-back drive axle of the present invention as shown in the plan view of FIG. 9. In FIG. 9 the wheel supporting axles 28a and 28b are again aligned in a straight line transversely of the vehicle as in the prior art vehicle of FIG. 8. However, in the vehicle of FIG. 9 the drive axles 19m and 19n are no longer in a straight line but are each displaced from the straight line position by an angle BO. For example, if this angle BO is 4° and the wheels 12c and 12d are pointing straight ahead, the angle CO between the wheel and the drive axle 19m is 86°. Assuming that the total permissible amount of turn of each wheel is again 90° (i.e., 45° in each direction), the left wheel will be able to turn 49° away from the straight ahead position to make a left hand turn as indicated by the angle B1 in FIG. 9. Since the angle C1 between the right wheel 12d and the swept-back axle 19n is also 86°, the right wheel will be able to turn only a total of 41° to make a left hand turn. However, the right wheel 12d inscribes a circle having a radius which is larger than the radius of the circle inscribed by the left wheel 12c, so that the angle B2 of the right wheel 12d will be less than 41° for the vehicle to travel around the center "C" of the turning circle. In a similar manner, when the vehicle 10b of FIG. 9 makes a right turn the right wheel 12d will be able to swing 49° to the right from the straight ahead position and inscribe a circle having a radius which is significantly smaller than the circle which would be made by the prior art vehicle 10a shown in FIG. 8. Thus, with all other components of the wheel drive and suspension system remaining the same, the swept-back axle feature results in a tighter turning circle.

From the foregoing description it will be seen that the present invention allows a gear-reduction unit to be mounted inside a power driven wheel which is also steerable. The gear-reduction unit is pivotally connected to a relatively long control arm which is pivotally connected to the frame of the vehicle for vertical movement. This allows a considerable amount of up and down movement of the wheel relative to the frame of the vehicle. A pair of universal joints and a drive axle couple power from the differential gears to the gear-reduction unit. This combination of universal joints and drive axles allows the wheel to turn to steer the vehicle and allows up and down movement of the wheel relative to the frame of the vehicle while continuously delivering driving power to the wheel. The swept-back axles of the steerable wheels decrease the minimum turning radius of the vehicle.

Although the best mode contemplated for carrying out the present invention has been herein shown and described, it will be apparent that modification and variation may be made without departing from what is regarded to be the subject matter of the invention.

What is claimed is:

1. In a motor vehicle having a wheel-steering arrangement and a motor-driven differential gear mounted on the frame of said vehicle, a steerable power-driven wheel combination comprising:
    a gear-reduction unit having an input shaft and an output shaft, said input shaft being located above said output shaft;
    means for mounting said wheel on said output shaft of said unit so that said unit is mounted directly adjacent to said wheel;
    a rigid control arm extending transversely of said vehicle;
    means for connecting one end of said control arm to said frame of said vehicle for pivotal movement about an axis extending longitudinally of said vehicle;
    means for pivotally connecting said gear-reduction unit to the other end of said control arm so that said wheel can pivot about a generally vertical axis;
    spring support means connected between said control arm and said frame of said vehicle and extending above said control arm; and
    flexible drive means connected between said differential gear and said input shaft of said gear-reduction unit.

2. A steerable power-driven wheel combination as defined in claim 1 including:
    a shock absorber connected between said control arm and said frame of said vehicle.

3. A steerable power-driven wheel combination as defined in claim 1 wherein said flexible drive means includes:
    a pair of universal joints and a length of axle shaft extending therebetween; means for connecting a first of said universal joints between said input shaft of said gear-reduction unit and one end of said axle shaft; and means for connecting a second of said universal joints between said differential gear and the other end of said axle shaft.

4. A steerable power-driven wheel combination as defined in claim 1 wherein said means for pivotally connecting said gear-reduction unit to said control arm includes a pair of vertically spaced thrust bearings mounted on said other end of said control arm.

5. A steerable power-driven wheel combination as defined in claim 4 wherein said thrust bearings are aligned to define an upwardly inclined pivot axis.

6. A steerable power-driven wheel combination as defined in claim 1 wherein said spring support means comprises an elastomeric spring connected between said frame and said control arm.

7. A steerable power-driven wheel combination as defined in claim 5 including a steering arm; and means for connecting said steering arm to said gear-reduction unit whereby the direction of travel of said wheel is determined by pivoting said gear-reduction unit on said control arm.

8. A steerable power-driven wheel combination as defined in claim 1 including a trailing arm for controlling the transverse movement of said control arm; means for connecting one end of said trailing arm to said frame of said vehicle rearwardly of said control arm; and means for connecting the other end of said trailing arm to said control arm adjacent said other end thereof.

9. A steerable power-driven wheel combination as defined in claim 1 wherein said means for connecting said control arm to said frame is located on the side of the vehicle opposite the side on which said wheel is mounted.

10. A steerable power-driven wheel combination as defined in claim 1 including means for connecting said flexible drive means between said differential gear and the input shaft of said gear-reduction unit so that the angle at said wheel between said drive means and the direction of heading of said vehicle is less than 90° when said wheel is pointed in a straight-ahead direction.

11. A steerable power-driven wheel combination as defined in claim 3 wherein said drive means extends downwardly from said differential gear to said wheel.

12. In a motor vehicle having a wheel-steering arrangement and a motor-driven differential gear mounted on the frame of said vehicle, said vehicle having a pair of steerable power-driven wheels, the combination comprising:
    a pair of gear-reduction units each having an input shaft and an output shaft, each of said wheels being mounted on said output shaft of a corresponding one of said units so that the unit is mounted directly adjacent to said wheel;
    means for pivotally mounting said gear-reduction units on opposite sides of said frame adjacent one end of said vehicle so that said wheels can pivot about a generally vertical axis to steer said vehicle;
    a pair of flexible drive means;
    means for connecting each of said drive means between said differential gear and the input shaft of a corresponding one of said gear-reduction units so that the angle at a wheel between the associated drive means and the direction of heading of said vehicle is less than 90° when said wheels are pointed in a straight-ahead direction.

13. The combination as defined in claim 12 wherein each of said flexible drive means includes:
    a pair of universal joints and a length of axle shaft, a first of said universal joints being connected between said input shaft of said gear-reduction unit and one end of said axle shaft, the second of said universal joints being connected between said differential gear and the other end of said axle shaft.

14. The combination as defined in claim 12 wherein said means for pivotally mounting each of said gear-reduction units to said frame includes a control arm that is connected to a fixed portion of the frame for pivotal movement about an axis extending longitudinally of said frame.

* * * * *